(12) United States Patent
Tanada et al.

(10) Patent No.: US 6,801,278 B2
(45) Date of Patent: Oct. 5, 2004

(54) LIQUID CRYSTAL DISPLAY APPARATUS HAVING FLEXIBLE SUBSTRATE AND CONCAVE FACES

(75) Inventors: Tetsushi Tanada, Fukushima-ken (JP); Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 540 days.

(21) Appl. No.: 09/975,344

(22) Filed: Oct. 10, 2001

(65) Prior Publication Data

US 2002/0041356 A1 Apr. 11, 2002

(30) Foreign Application Priority Data

Oct. 11, 2000 (JP) ........................................ 2000-311167

(51) Int. Cl.[7] .......................................... G02F 1/1335
(52) U.S. Cl. ...................... 349/113; 349/158; 349/160
(58) Field of Search ................................ 349/113, 158, 349/160

(56) References Cited

U.S. PATENT DOCUMENTS

| | | | | |
|---|---|---|---|---|
| 5,288,591 A | * | 2/1994 | Blonder | 430/321 |
| 5,550,658 A | * | 8/1996 | Yoshihiro | 349/62 |
| 6,061,112 A | * | 5/2000 | Ukita et al. | 349/113 |
| 6,130,736 A | | 10/2000 | Sasaki et al. | |
| 6,141,073 A | * | 10/2000 | Sasaki et al. | 349/122 |
| 6,229,586 B1 | * | 5/2001 | Date et al. | 349/113 |
| 6,473,145 B1 | * | 10/2002 | Shim et al. | 349/113 |
| 6,509,943 B2 | * | 1/2003 | Baek et al. | 349/113 |
| 6,538,711 B2 | * | 3/2003 | Funahata et al. | 349/113 |
| 6,621,542 B1 | * | 9/2003 | Aruga | 349/113 |

* cited by examiner

Primary Examiner—Robert H. Kim
Assistant Examiner—Andrew Schechter
(74) Attorney, Agent, or Firm—Brinks Hofer Gilson & Lione

(57) ABSTRACT

The invention provides a liquid crystal display apparatus having a flexible substrate that realizes the bright and high quality display. A liquid crystal display apparatus has a liquid crystal layer interposed between a pair of flexible substrates that face each other, and a plurality of concave faces having a spherical inner surface are formed continuously on the surface of the substrate that faces the liquid crystal layer side.

8 Claims, 2 Drawing Sheets

LIQUID CRYSTAL DISPLAY APPARATUS HAVING FLEXIBLE SUBSTRATE AND CONCAVE FACES

BACKGROUND OF THE INVENTION

1. Field of the Invention

This invention relates to a liquid crystal display apparatus having a flexible substrate.

2. Description of the Related Art

A liquid crystal display apparatus that consumes minimal power has been used currently as a display unit for portable electronic apparatuses such as portable information terminals or cellular phones. In particular, reflection type liquid crystal apparatuses are used for most products as a backlight is not necessary, resulting in minimal power consumption and increased battery life.

Meanwhile, a liquid crystal display apparatus that employs a resin film substrate instead of a conventional glass substrate has been developed to answer the ever-increasing need for further miniaturization and weight decrease of the electronic apparatus.

One example of a reflection type liquid crystal display apparatus having a film substrate as described hereinabove will be described briefly with reference to FIG. 3. FIG. 3 is a diagram showing a partial cross-sectional view of a liquid crystal display apparatus having a conventional configuration. In FIG. 3, the liquid crystal display apparatus 100 comprises a first film substrate 110 and a second film substrate 120, which face each other, and a liquid crystal layer 130 that is sealed between the two film substrates 110 and 120.

A laminated structure of an electrode layer 115 consisting of transparent conductive film such as ITO (indium-tin oxide) operates liquid crystal molecules of the liquid crystal layer 130 and an orientation film 116 controls the orientation of liquid crystal molecules are formed on the liquid crystal layer side of the first film substrate 110. Another laminated structure of an electrode layer 125 and orientation film 126 are formed on the liquid crystal layer side of the second film substrate 120. Furthermore, a reflection plate 128 is provided on the opposite side of the second film substrate 120 (the outer face side of the second film substrate 120).

Furthermore, a reflector 140 having one surface on which a reflection film 141 of aluminum is formed on the outer face side of the first film substrate 110. An adhesive 142 is formed between the reflection film 141 and the substrate 110.

The liquid crystal display apparatus 100 having the above-mentioned configuration has been used as a reflection type liquid crystal display apparatus in which solar energy or other external illumination is used as the light source. Light incident from the outside of the second substrate 120 is reflected on the reflection film 141 and used for displaying.

Furthermore, because a film substrate that is thinner than a conventional glass substrate is used as the substrate, it is possible to make an electronic apparatus having the above-mentioned liquid crystal display apparatus thin, and parallax is suppressed to bring about a high quality display.

However, according to the configuration of the liquid crystal display apparatus 100, because the exterior type reflector 140 reflects the incident light, the light incident from the second substrate 120 side to the liquid crystal display apparatus 100 passes through the two substrates 110 and 120 and a reflection plate 128 inevitably before the light reaches the reflection film 141 of the reflector 140. As the result, the light transmission loss is large, and the brightness of the display is insufficient.

Furthermore, because the liquid crystal display apparatus 100 comprising the above-mentioned film substrate is a component used as the display unit of, for example, a cellular phone and low cost is required, it is very important to simplify the configuration and manufacturing process of the liquid crystal display apparatus so that the cost is reduced.

The present invention has been accomplished to solve the above-mentioned problems, and it is an object of the present invention to provide a liquid crystal display apparatus having a flexible substrate that is capable of displaying high quality images with high brightness.

It is another object of the present invention to provide a liquid crystal display apparatus having a simplified configuration that reduces manufacturing costs.

SUMMARY OF THE INVENTION

To achieve the above-mentioned object, a liquid crystal display apparatus according to a first aspect of the present invention comprises a pair of substrates disposed to face each other with interposition of a liquid crystal layer, at least one of the substrates is a flexible substrate, and a plurality of concave faces each having a spherical inner surface and formed continuously on the surface of at least one substrate facing the liquid crystal layer.

According to the configuration in accordance with the present invention, because the concave faces are formed continuously on one surface of a flexible substrate, the configuration of the liquid crystal display is simplified to bring about the reduced manufacturing cost.

Next, the liquid crystal display apparatus according to a second aspect has a metal reflection film formed on the substrate surface.

According to the above-mentioned configuration, the reflection type liquid crystal display apparatus of the present invention has a built-in reflection plate for reflecting the light between the pair of substrates. Because the metal reflection film is shaped as described hereinabove, the reflection efficiency of the metal reflection film is improved to bring about a bright display.

Next, the liquid crystal display apparatus according to a third aspect has a depth of the concave faces ranging from 0.1 $\mu$m to 3 $\mu$m, an inclination distribution of the inner surface of the concave faces ranging from −30 degrees to +30 degrees, and a pitch between adjacent concave faces ranging from 5 $\mu$m to 50 $\mu$m.

According to the configuration as described hereinabove, because the reflection efficiency of the metal reflection film is optimized, the light incident from the outside is reflected efficiently, and a bright reflection display is realized.

Next, the liquid crystal display apparatus according to a fourth aspect has a metal reflection film having a film thickness ranging from 80 Å to 300 Å.

According to the configuration as described hereinabove, because the film thickness of the metal reflection film is made very thin, a bright transmission display is realized and the metal reflection film reflects light efficiently even when a light source for transmission display is used that is external to the substrate to fabricate a semi-transmission/reflection type liquid crystal display apparatus. In other words, a semi-transmission/reflection type liquid crystal display apparatus that gives a bright and easily visible display for both transmission display and reflection display is realized.

Next, the liquid crystal display apparatus according to a fifth aspect has a metal reflection film with a film thickness ranging from 80 Å to 100 Å.

According to the configuration as described hereinabove, a semi-transmission/reflection type liquid crystal display apparatus that gives a bright reflection display and an extraordinarily bright transmission display is realized.

Next, the liquid crystal display apparatus according to a sixth aspect has a color filter formed directly on the metal reflection film.

According to the configuration as described hereinabove, because the color filter is formed on the surface on which light incident from the outside is reflected, the parallax and color deviation is minimized and the high quality display is realized.

Next, the liquid crystal display apparatus according to a seventh aspect has a colored substrate with the surface on which the concave faces are formed.

According to the configuration as described hereinabove, the color of the colored substrate may be used as the display color in the case that a reflection type liquid crystal display apparatus is fabricated. In other words, a display having the color purity higher than that of the display obtained by means of orientation control of liquid crystal molecule is realized.

Next, the liquid crystal display apparatus according to a eighth aspect has a flexible substrate comprising polyallylate base, polycarbonate base, polyethersulphone base, or polyethylene terephthalate base resin.

According to the configuration described hereinabove, because the resins described hereinabove are highly transparent, the bright display is realized for both reflection display and transmission display. Furthermore, because the above-mentioned resin materials are excellent in heat resistance and a film can be formed at a high temperature, a high quality liquid crystal display apparatus is realized.

DETAILED DESCRIPTION OF THE PREFERRED EMBODIMENTS

Figure 1:
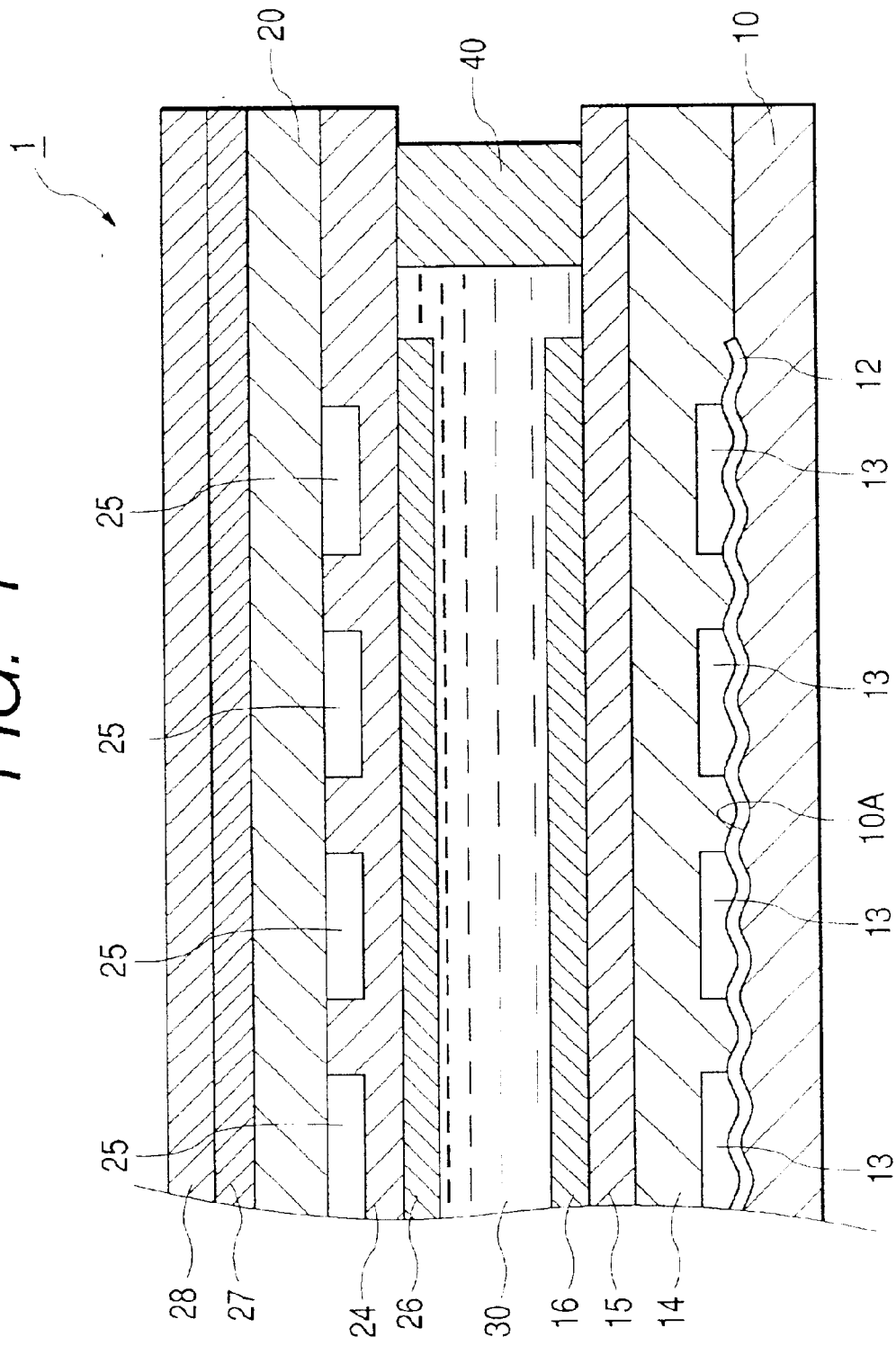
FIG. 1 is a diagram showing a partial cross sectional configuration of a liquid crystal display apparatus in accordance with an embodiment of the present invention.

One embodiment of the present invention will be described in detail hereinafter with reference to FIG. 1. However, the present invention is by no means limited to the embodiment described hereinafter. The drawings that will be referred in the present specification are presented only for describing the liquid crystal display apparatus. Structural components, the magnitude of dimension, size, and thickness of elements shown in the drawings may be different from those of the actual liquid crystal display apparatus.

FIG. 1 is a diagram showing a partial cross sectional view of a liquid crystal display apparatus in accordance with an embodiment of the present invention. In FIG. 1, a liquid crystal display apparatus 1 comprises a liquid crystal layer 30 interposed between a first substrate 10 and second substrate 20 face each other, and the peripheries of the two substrates 10 and 20 are bonded together with sealing material 40. The two substrates 10 and 20 consist of flexible resin in the present embodiment, but a glass substrate may be used as the second substrate 20.

A convex/concave face 10A is formed on the liquid crystal layer 30 side of the above-mentioned first substrate 10, and the convex/concave face 10A is shaped so that the plurality of concave faces, each of which constitutes a part of a spherical surface, are formed continuously. A laminated structure containing a metal reflection film 12 for reflecting incident light that comes from the outside, a color filter 13 for displaying colors, an overcoat film 14 for protecting and flattening the film surface of these films, an electrode layer 15 for driving the liquid crystal layer 30, and an orientation film 16 for controlling the orientation of liquid crystal molecules that constitute the liquid crystal layer 30 is formed on the convex/concave face 10A. Another laminated structure containing an electrode layer 25, an overcoat film 24, and an orientation film 26 is formed on the liquid crystal layer 30 side of the second substrate 20. Furthermore, on the outer face side (upper side in the drawing) of the second substrate 20, a phase difference plate 27 that controls the wavelength dispersion of the light, and a reflection plate 28 that controls reflection of the light are laminated in the order.

The first substrate 10 preferably consists of a material that is highly transmissive to light (preferably 90% or higher, same as that of a glass) and is heat resistive at a temperature of 200° C. or higher. If a less transmissive material is used, the light loss of the light incident from the outside that travels through the liquid crystal display apparatus 1 is large and the display is dark. If a material that is not resistive to a temperature of 200° C. or higher, the resistivity of the transparent conductive film used as the electrode layer 15 increases and the power consumption is large.

Particularly, a transparent conductive film such as ITO is used as the electrode layer 15. Note that an ITO film formed at a low film-forming temperature exhibits significantly larger resistivity in comparison with ITO formed at a high temperature of 200° C. or higher. Furthermore, if the film thickness is increased to reduce the resistivity of ITO formed at a low temperature, the increased film thickness causes reduced light transmittance and warpage of the substrate 10 due to stress of the electrode layer 15. As described hereinabove, the heat resistance of the substrate 10 is very important, and the quality of the liquid crystal display apparatus 1 depends significantly on the heat resistance of the substrate 10.

Examples of the material preferably used for the above-mentioned first substrate 10 include resin materials such as polyallylate base resin, polyether-sulphone base resin, polyethylene-terephthalate based resin, and polycarbonate base resin, but the material is by no means limited to those resins. Polyallylate base resin is used more preferably because the heat resistance temperature is as high as 280° C., the light transmittance is as high as 90% or higher, and the birefringence is as low as 0.

The first substrate 10 is formed of the above-mentioned material, and a gas barrier layer consisting of silicon oxide film or silicon nitride film may be formed on one side or both sides of the first substrate 10. The configuration having the above-mentioned gas barrier layers on the substrate 10 excludes adverse effects on the liquid crystal layer 30 due to de-gassing from the above-mentioned resin material or gas that penetrates into the liquid crystal display apparatus 1 through the above-mentioned resin material from the outside. As the result, the reliability of the liquid crystal display apparatus 1 is improved.

Although a different material, such as glass, may be used as the second substrate 20, preferably the first substrate 10 and second substrate 20 are formed of the same material. If the same material is used for the first substrate 10 and the second substrate 20, a liquid crystal display apparatus that is excellent in reliability can be obtained because the thermal expansion coefficient of the two substrates 10 and 20 is identical. This results in less rupture of the circuit caused by changes in the ambient environment temperature.

Furthermore, the first substrate 10 disposed on the back face side of the liquid crystal display apparatus 1 may be pigmented. For example, if the substrate 10 is pigmented black to obtain a black display, the color purity is higher than that of a black display created by reflection control of the liquid crystal molecules, thereby realizing a liquid crystal display apparatus with an excellent display quality and improved contrast.

The electrode layer 15 comprises a plurality of aligned flat rectangular transparent conductive films consisting of ITO, which may be connected individually to an external driving circuit (not shown in the drawing). Furthermore, the electrode layer 25 formed on the second substrate 20 also comprises a plurality of aligned flat rectangular transparent conductive films like the above-mentioned electrode layer 15, connected individually to an external driving circuit. The electrode layer 15 and the electrode layer 25 are disposed to make a right angle with each other (in a plan view), and a passive matrix type liquid crystal display apparatus 1 is formed.

In the liquid crystal display apparatus in accordance with the present invention, because the substrate 10 and/or the substrate 20 is formed of resin material with high heat resistance as described hereinabove, it is possible to form the transparent conductive film at a high temperature. As the result, the electrode layers 15 and 25 having the light transmittance and resistivity equivalent to those of the transparent conductive film formed on a glass substrate at a high temperature can be obtained and a high performance liquid crystal display apparatus is realized.

The overcoat film 14 of the first substrate 10 and the overcoat film 24 of the second substrate 20 are provided to equalize the thickness of the liquid crystal layer 30 by flattening the irregular thickness of the substrates 10 and 20 and layers formed on those substrates 10 and 20.

If the substrates 10 and 20 of the liquid crystal display apparatus 1 are formed of resin material, because to avoid adverse effects caused by degassing from the above-mentioned resin material on the liquid crystal layer 30, the above-mentioned overcoat films 14 and 24 are formed to cover the entire liquid crystal layer side surface of each of the substrates 10 and 20. The overcoat films 14 and 24 formed to cover this surface prevent degassing from the substrates 10 and 20 and penetration to the liquid crystal layer 30, and deterioration due to degassing of the liquid crystal layer 30 is prevented.

The metal reflection film 12 is provided to efficiently reflect light incident from the outside onto the liquid crystal display apparatus 1 to obtain a bright display, and is formed on the convex/concave face 10A that is formed on the liquid crystal layer side of the first substrate 10 as shown in FIG. 1. The metal reflection film 12 may consist preferably of a metal material with high reflection such as aluminum or silver. Furthermore, the metal reflection film 12 is formed by sputtering or vacuum evaporation of these metals.

Furthermore, the metal reflection film 12 is preferably formed only on the convex/concave face 10A that is the one convex/concave-shaped face of the substrate 10 as shown in FIG. 1. The reason is that the outer end of the metal reflection film 12 formed on the entire surface of the liquid crystal layer 30 of the substrate 10 is exposed directly to the outside air and the metal reflection film 12 can be oxidized from the outer end to result in separation of the film 12.

Furthermore, the color filter 13 is formed directly on the metal reflection film 12. The color filter 13 can be disposed on the reflection surface (the surface of the metal reflection film 12) that reflects the light incident from the outside because of the above-mentioned structure, and the color deviation and parallax can be reduced. As the result, the liquid crystal display apparatus 1 of the present invention displays high quality images.

The thickness of the metal reflection film 12 ranges preferably from 80 Å to 300 Å.

The above-mentioned film thickness allows the display to be viewed easily and brightly for both reflection displaying and transmission displaying in the case that a semi-transmission/reflection type display apparatus provided with a backlight on the outside of the substrate 10 is fabricated. The metal reflection film 12 can be formed very thin as described hereinabove because of the configuration of the convex/concave face 10A of the first substrate 10. In other words, the thinner film thickness of the metal reflection film 12 results in reduced reflectance of the metal reflection film 12, but the above-mentioned convex/convex shape of the metal reflection film 12 brings about higher light reflectance. As the result, it is possible to display an image with a brightness higher than that of a conventional apparatus even if the film thickness of the metal reflection film 12 is formed thin.

Furthermore, the very thin film thickness (as thin as 80 Å to 100 Å) of the metal reflection film 12 renders the metal reflection film 12 highly transmissive, and a very bright display is realized for transmission displaying.

As described hereinabove, the liquid crystal display apparatus of the present invention realizes the bright and easy-viewing display also in the case that a semi-transmission/reflection type liquid crystal display apparatus provided with a backlight on the outside of the substrate 10 is fabricated.

The film thickness range of the metal reflection film 12 described hereinabove is suitable for the semi-transmission/reflection type liquid crystal display apparatus that is used for both reflection display and transmission display. In the case of a reflection type liquid crystal display apparatus used only for reflection display, the film thickness is not limited and, for example, a film thickness of 1000 Å may be used.

The reflection type liquid crystal display apparatus provided with a metal reflection film 12 is described in the present embodiment, but the metal reflection film 12 may be omitted. If the metal reflection film 12 is omitted, the liquid crystal display apparatus 1 is used as a transmission type liquid crystal display apparatus. In such case, the light is scattered effectively by means of the above-mentioned convex/concave face 10A and a transmission type liquid crystal display apparatus excellent in white display is realized.

Furthermore, the inner surface of each of the concave faces of the above-mentioned convex/concave face 10A is spherical. This is to say that each inner surface is a part of a spherical surface, and thus the surface functions as a lens to intensify light incident from the outer face side of the first substrate 10, making it possible to render the display bright.

As described hereinabove, because the convex/concave face 10A functions to intensify the light, the liquid crystal display apparatus of the present invention can realize the bright display with a reduced backlight intensity that is provided on the outside of the substrate 10 for transmission display. As the result, it is possible to reduce the power consumption of the backlight, which consumes the power for the liquid crystal display apparatus mostly, and a low power consumption liquid crystal display apparatus is realized.

Figure 2:
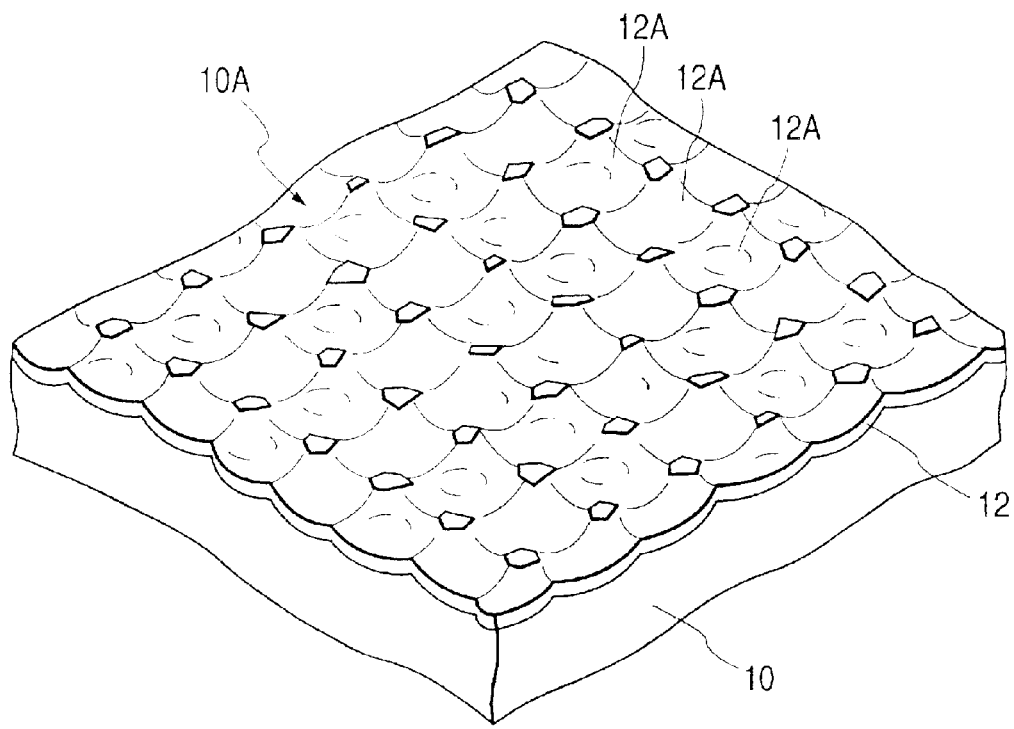
FIG. 2 is a partially enlarged perspective view showing a substrate including the convex/concave faces shown in FIG. 1.
Figure 3:
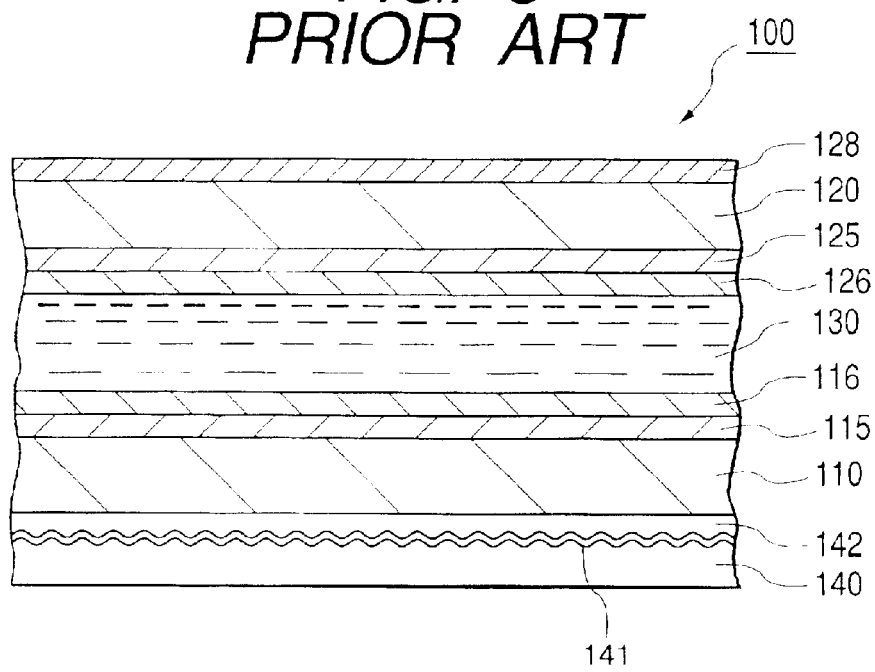
FIG. 3 is a diagram showing the partially cross sectional configuration of an exemplary reflection type liquid crystal display apparatus having a conventional flexible substrate.

The configuration of the convex/concave face 10A shown in FIG. 1 will be described in detail with reference to FIG. 2. FIG. 2 is a perspective view showing the first substrate 10 and the part including the metal reflection film 12 formed on the first substrate 10. As shown in FIG. 2, the inner face of the concave faces 12A, each of which is a part of the spherical surface, is formed continuously on the surface of the convex/concave face 10A of the substrate 10 to overlap each other, and the metal reflection film 12 is laminated on the surface.

It is preferable that the depth of the above-mentioned concave faces 12A is formed randomly in the range from 0.1 μm to 3 μm, the pitch between adjacent concave faces 12A is disposed randomly in the range from 5 μm to 50 μm, and the inclination of the inner surface of the above-mentioned concave faces 12A is set in the range from −30 degrees to 30 degrees.

Particularly setting of the inclination distribution of the inner face of the concave faces 12A in the range from −30 degrees to 30 degrees and the random disposition of the pitch of the adjacent concave faces 12A in all directions in a plane are important. The reason is that, if the pitch of the adjacent concave faces 12A is regular, the reflected light is colored due to interference color of the light. Furthermore, if the inclination distribution of the inner face of the concave faces 12A deviates from the range from −30 degrees to 30 degrees, the diffusion angle of the reflected light is too wide and results in reduced reflection intensity and bright display cannot be obtained (the diffusion angle of the reflected light is equal to or larger than 60 degrees to result in reduced reflection intensity peak in the liquid crystal display apparatus and result in large total reflection loss).

Furthermore, if the depth of the concave faces 12A exceeds 3 μm, the peaks cannot be buried with the flattening film (overcoat film 14) when the concave faces 12A are flattened in the subsequent process step. As a result, the desired flatness cannot be obtained and a depth that exceeds 3 μm causes the display to be irregular.

If the pitch of the adjacent concave faces 12A is less than 5 μm, the fabrication work for making a transfer die that is used for forming the convex/concave face 10A of the first substrate 10 is limited, and the working time increases. Furthermore, the shape for obtaining desired reflection characteristic cannot be formed and interferential light is caused. In addition, as a diamond indenter having a diameter of 30 μm to 100 μm is used to fabricate the transfer die, it is preferable that the pitch is in the range from 5 μm to 50 μm between the adjacent concave faces 12A.

In the case of the liquid crystal display apparatus 1 of the present invention, because the metal reflection film 12 formed on the convex/concave face 10A of the first substrate 10 is shaped in a convex/concave fashion, the incident light is reflected and scattered efficiently, and a display having a bright reflection and wide angle of visibility are realized. These advantages of the present invention are due to the control of the depth and pitch of the concave faces 12A shown in FIG. 2 in the range as described hereinabove and due to the spherical surface of the inner face of the concave faces 12A.

In detail, the depth and pitch of the concave faces 12A are formed under control, the inclination of the inner surface of the concave faces 12A that controls the light reflection angle is controlled in a certain range. As the result, the reflection efficiency of the metal reflection film 12 can be controlled within a certain range. Furthermore, because the inner surface of the concave faces 12A is symmetrically spherical in all the directions, the above-mentioned reflection efficiency can be obtained for all the directions of the metal reflection film 12. To sum up, the bright display can be seen from all the directions.

The convex/concave face 10A of the first substrate 10 is formed by hot-pressing a resin material sheet to shape it in the form of the first substrate 10 by use of a transfer die. The above-mentioned transfer die is made by a diamond indenter pressed on the surface of flat base material such as stainless steel, and the configuration of the convex/concave face 10A shown in FIG. 2 is formed by use of an inversely convex/concave die.

The process conditions applied in the hot-pressing process such as temperature, pressure, and time may be selected suitably depending on the type of material and the size of the substrate 10. For example, the process temperature is preferably a temperature 10° C. to 20° C. lower than the heat-resisting temperature of the material of the first substrate 10. More in detail, in the case that, for example, polyallylate resin sheet having a thickness of 0.3 mm is used for the substrate 10, the process condition for forming the convex/concave face 10A includes a process temperature of 170° C. to 180° C., pressure of 100 to 200 kg/cm$^2$, and process time of 1 to 3 minutes. Note however that these process conditions are merely one example, the process conditions are by no means limited to the above-mentioned conditions.

The convex/concave face 10A formed by hot-pressing is preferably formed on the entire face of the substrate 10 excepting the periphery of the substrate 10. The structure as described hereinabove has flat surface on the periphery of the substrate 10, and the overcoat film 14 can be fit on the substrate 10 firmly. As the result, the overcoat film 14 will not be separated from the substrate 10, and it is possible that the liquid crystal display apparatus 1 of the present invention retains high reliability for a number of years in a high temperature and high humidity environment (for example, a temperature equal to or higher than 60° C. and a humidity equal to or higher than 90%).

Furthermore, because a hot-pressing method is used as a method for forming the convex/concave face 10A, a large substrate may be hot-pressed. This large hot-pressed substrate may then be divided into substrates 10 having a desired size. Therefore, a plurality of substrates 10 on which the convex/concave face 10A are formed can be obtained in one operation efficiently.

As described hereinbefore in detail, according to the liquid crystal display apparatus of the present invention, the convex/concave configuration (a configuration in which continuous concave faces each have an inner surface that is a part of the spherical surface) is formed directly on the surface of the liquid crystal layer side of the substrate of the liquid crystal display apparatus having a flexible substrate. As the result, the configuration of the liquid crystal display apparatus is made simpler than that of the conventional liquid crystal display apparatus and the manufacturing cost is reduced.

Next, a reflection type liquid crystal display apparatus provided with a metal reflection film formed on the surface of the above-mentioned substrate where the convex/concave face is formed has an improved light reflectance due to the above-mentioned surface configuration. As the result, a reflection type liquid crystal display apparatus having a bright and easily viewable display and wide angle of visibility is realized.

In the case that a semi-transmission/reflection type liquid crystal display apparatus provided with a backlight for transmission display on the outside of the substrate having a metal reflection film with a film thickness of 80 Å to 300 Å is fabricated, a bright reflection display is obtained due to the surface configuration of the above-mentioned substrate in the reflection mode in which the solar light or illumination is used as the light source for displaying an image. On the other hand, in the case of the transmission mode in which the light from a backlight is used as the light source for displaying an image, a bright display is obtained due to the high transmittance of the metal reflection film. As the result, in both operation modes, a semi-transmission/reflection type liquid crystal display apparatus that displays a bright and easily viewable image is provided.

Furthermore, in the case that the film thickness of the metal reflection film of the above-mentioned semi-transmission/reflection type liquid crystal display apparatus is in the range from 80 Å to 100 Å, a semi-transmission/reflection type liquid crystal display apparatus that gives very bright display in the transmission mode is provided.

Particularly, because the inner surface of the concave faces formed on the above-mentioned substrate surface is a part of spherical surface, the light supplied from a backlight is enhanced by the lens effect, and the semi-transmission/reflection type liquid crystal display apparatus provides a bright transmission display. Furthermore, it is possible to employ a backlight of a lower light intensity because of the above reason, a low power consumption liquid crystal display apparatus is realized.

Next, according to the liquid crystal display apparatus of the present invention, because a color filter is formed immediately on the metal reflection film, the parallax and the color deviation are reduced and the high quality display is realized.

Next, according to the liquid crystal display apparatus of the present invention, in the case that a colored substrate having the surface on which the convex/concave configuration is formed is used, the color of the substrate is used as the display color, and it is possible to give a display of higher color purity than that of a display obtained by means of orientation control of the liquid crystal molecule.

Next, according to the liquid crystal display apparatus of the present invention, in the case that the above-mentioned substrate is formed of resin such as polyallylate base resin, polycarbonate base resin, polyethersulphone base resin, or polyethylene terephthalate base resin, the substrate is rendered highly light transmissive and highly heat resistive. As the result, the layers can be formed on the substrate at a high temperature. A quality liquid crystal display apparatus is provided thereby.

According to the present invention, in both cases that a semi-transmission/reflection type or a reflection type liquid crystal apparatus is fabricated, a liquid crystal display apparatus that gives a bright display and wide angle of visibility is provided.

Furthermore, according to the present invention, the configuration is simplified to bring about reduced manufacturing cost of the liquid crystal display apparatus.

What is claimed is:

1. A liquid crystal display apparatus comprising a pair of substrates disposed to face each other with interposition of a liquid crystal layer, at least one of the substrates being a flexible substrate, wherein a plurality of concave faces having a spherical inner surface are formed continuously on a surface of at least one of the substrates, the substrate surface facing the liquid crystal layer.

2. The liquid crystal display apparatus according to claim 1, wherein a depth of the concave faces ranges from 0.1 $\mu$m to 3 $\mu$m, an inclination distribution of the inner surface of the concave faces ranges from −30 degrees to +30 degrees, and a pitch between adjacent concave faces ranges from 5 $\mu$m to 50 $\mu$m.

3. The liquid crystal display apparatus according to claim 1, wherein a metal reflection film is formed on the substrate surface.

4. The liquid crystal display apparatus according to claim 3, wherein a film thickness of the metal reflection film ranges from 80 Å to 300 Å.

5. The liquid crystal display apparatus according to claim 3, wherein a film thickness of the metal reflection film ranges from 80 Å to 100 Å.

6. The liquid crystal display apparatus according to claim 3, wherein a color filter is formed directly on the metal reflection film.

7. The liquid crystal display apparatus according to claim 1, wherein the substrate surface is colored.

8. The liquid crystal display apparatus according to claim 1, wherein the flexible substrate comprises one of a polyallylate base, polycarbonate base, polyethersulphone base, and polyethylene terephthalate base resin.

* * * * *